United States Patent
Witt et al.

(10) Patent No.: US 6,404,324 B1
(45) Date of Patent: Jun. 11, 2002

(54) RESISTIVE COMPONENT FOR USE WITH SHORT DURATION, HIGH-MAGNITUDE CURRENTS

(75) Inventors: David B. Witt, Fishers; Scott E. Crawford, Indianapolis, both of IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/453,047

(22) Filed: Sep. 7, 1999

(51) Int. Cl.$^7$ ............................................. H01C 10/14
(52) U.S. Cl. .................. 338/320; 338/309; 338/320; 338/322; 338/328; 338/50; 338/59
(58) Field of Search .............................. 338/50, 51, 59, 338/295, 239, 254, 260, 309, 316, 319, 320, 321, 322, 324, 325, 328

(56) References Cited

U.S. PATENT DOCUMENTS

| | | | |
|---|---|---|---|
| 2,440,691 A | * 5/1948 | Jira | 338/322 |
| 2,640,906 A | * 6/1953 | Haynes | 219/445 |
| 4,196,411 A | * 4/1980 | Kaufman | 338/314 |
| 5,254,969 A | * 10/1993 | Caddock, Jr. | 338/308 |
| 5,291,174 A | * 3/1994 | Zirnheld et al. | 338/24 |
| 5,291,175 A | * 3/1994 | Ertmer et al. | 338/59 |
| 5,581,227 A | * 12/1996 | Drekmeier | 338/51 |
| 5,859,581 A | * 1/1999 | Morris | 338/50 |
| 5,932,128 A | * 8/1999 | Dishop | 338/320 |

OTHER PUBLICATIONS

Instrument Engineers Handbook, V. II, pp. 398–404 (Ed. by Liptak(1970).*
Literature from FERRO–ECA Electronics describing a high power resistive element on a metal core ceramic coated printed circuit board. Date of publication: 1998 or earlier.

* cited by examiner

Primary Examiner—Karl D. Easthom
(74) Attorney, Agent, or Firm—Christopher DeVries

(57) ABSTRACT

A resistor having a generally planar substrate with a resistive element located on each side of the substrate and a plurality of terminals for connecting opposing portions of each of the resistive elements to an electronic circuit. The resistive elements have substantially equal dimensions and resistive properties such that they have substantially equal resistance values and exhibit substantially equal current densities for any given applied voltage. The substrate can be a ceramic-coated metal core with the resistive elements silk-screened onto opposite sides of the substrate. The resistive elements have a substantially uniform thickness so that they exhibit a uniform current density when subjected to an applied voltage. With this dual resistive layer design, thermal bending of the resistor due to differential thermal expansion at one of the ceramic layers is substantially offset by thermal bending due to differential thermal expansion at the other ceramic layer. Accordingly, the resistor can be designed with a small physical size and a relatively low steady-state wattage rating, but with the ability to handle short duration, high-wattage power surges.

4 Claims, 3 Drawing Sheets

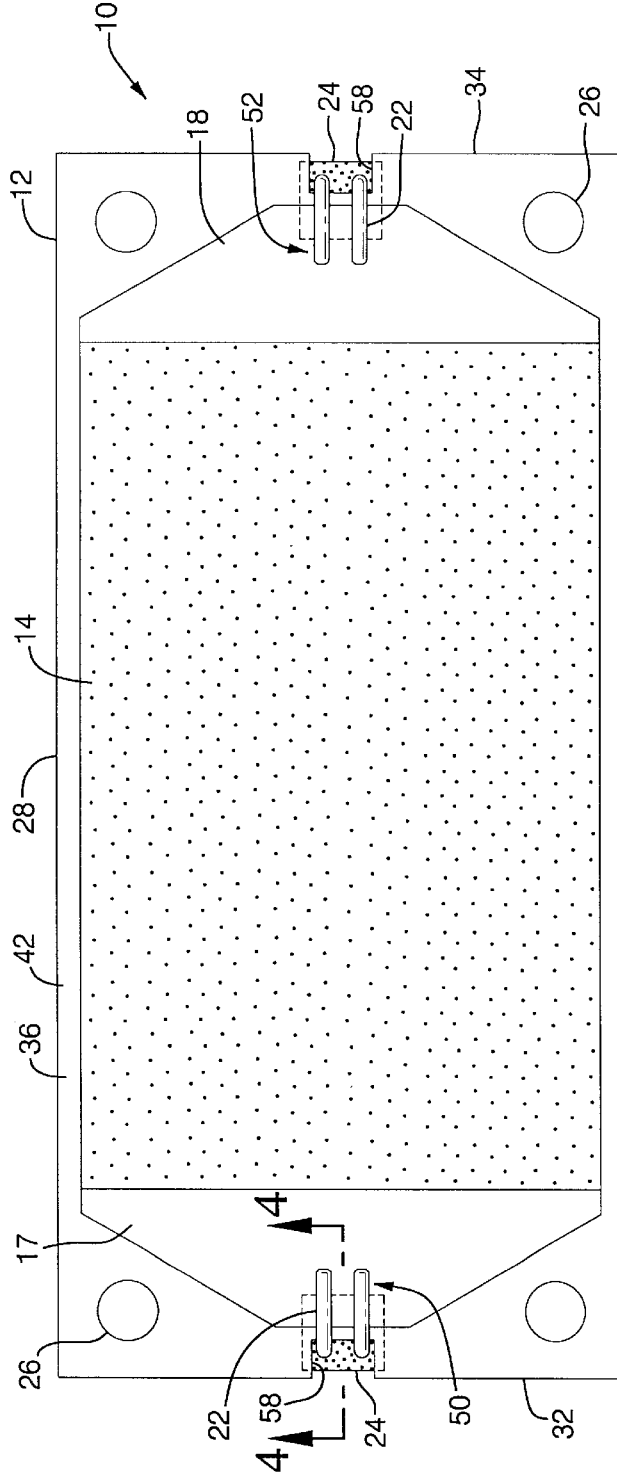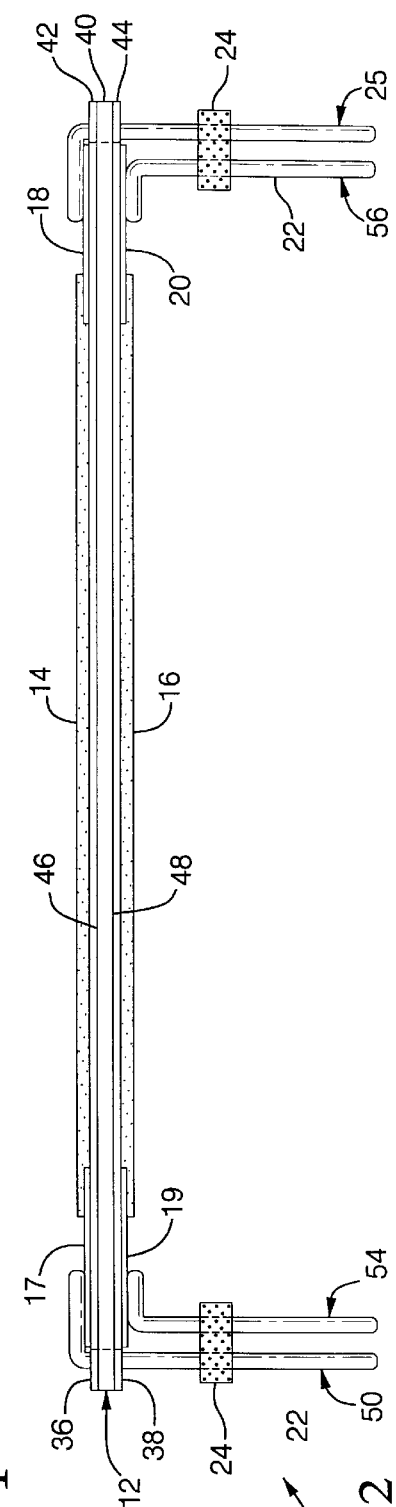
FIG. 1
FIG. 2

RESISTIVE COMPONENT FOR USE WITH SHORT DURATION, HIGH-MAGNITUDE CURRENTS

TECHNICAL FIELD

The present invention relates generally to resistors and, more particularly, to power resistors used for periodically dissipating large amounts of electrical energy over short time periods.

BACKGROUND OF THE INVENTION

Resistors are typically identified and characterized by their resistance value, tolerance, and power dissipation capability. Of these, both resistance and tolerance are substantially independent of the conditions under which the resistor is used. However, the resistor's power dissipation capability, or power rating, is specifically directed toward continuous, steady-state conditions and, while a resistor may have the ability to handle transient power surges in excess of its power rating, relatively little work has been done to develop resistors that are designed for applications involving small, steady-state currents with large transient energy surges.

One such application is in electric vehicles which typically utilize a high-voltage bus of approximately 360 volts to power various vehicle systems, including an inverter used to drive the three-phase motor that provides operating power to the vehicle wheels. Usually, the high-voltage bus includes a capacitor bank of, for example, 15,000 $\mu$F, with these capacitors being charged from the high-voltage supply. The capacitor bank filters out transient voltages and helps reduce ripple on the high-voltage bus. To prevent destructively high currents during charging of these capacitors, a high-wattage current-limiting resistor is often used, with its resistance being limited to a relatively small value due to the large capacitance of the capacitors and the relatively short time in which they must be charged. For example, for a high-voltage supply of 360–400 volts, a capacitor bank of 15,000 $\mu$F, and a 200 ohm current-limiting resistor (which provides three time constants of capacitor charging within nine seconds), approximately 1,200 Joules of energy must be transferred via the resistor. Due to the exponential current profile of the circuit, over half of this energy is transferred within the first second, resulting in an initial peak power surge of 800 watts with over 600 watts of power being dissipated by the resistor in the first one and one-half seconds of charging. Once charged, there is minimal steady-state current flow through the resistor with some electric vehicle applications including a bypass switch that removes the current-limiting resistor from the circuit altogether once the capacitors are charged.

Although this electric vehicle high-voltage bus application requires periodic dissipation of energy on the order of 600 to 800 watts, use of a resistor at this wattage rating is not practical due to space and cost considerations. Rather, a common alternative to using a single, high-wattage resistor is to employ two or more lower wattage resistors which together dissipate the total power supply by the high-voltage battery. For example, in a typical application such as described above, the required current-limiting resistance has been implemented using two 100 ohm, 50 watt, wire-wound aluminum cased-resistors connected in series. However, the size and termination geometry of these resistors still make it impractical for circuit board mounting of the resistors inside the environmentally sealed high-voltage enclosure that is typically used in these electric vehicle applications. Accordingly, the resistors must be mounted externally, necessitating expensive manual assembly utilizing mounting screws, flying leads, and heat-shrinkable tubing for high-voltage isolation. Although a larger number of lower wattage resistors could be utilized to permit printed circuit board mounting of the resistors inside the environmentally sealed enclosure, such an arrangement has been found to be undesirable as well, as it can require considerable space and can greatly increase the overall part count.

Apart from conventional carbon and wire-wound resistors, there exists a number of other power resistor design configurations. For example, some manufacturers offer customized printed circuit boards that can include thick film power resistors printed directly onto the printed circuit board surface. One such customizable printed circuit board is available from FERRO-ECA Electronics Company of Erie, Pennsylvania and includes a ceramic-coated metal core substrate having a printed circuit that can include pre-printed thick film resistor elements. However, these commercially available boards have been found to be unsuitable for the high-voltage bus current-limiting application discussed above since they are designed for somewhat lower power applications and are limited to a maximum power dissipation of 100 watts per square inch.

Accordingly, it is a general object of this invention to provide a resistive component that is capable of withstanding periodic, short-duration high-wattage peak power surges. Preferably, it is also an object of this invention to provide such a resistive component that is relatively compact in size and that can be mounted to a printed circuit board.

SUMMARY OF THE INVENTION

In accordance with the present invention, there is provided a resistive component that includes a generally planar substrate with a resistive element located on each side of the substrate and a plurality of terminals for connecting opposing portions of each of the resistive elements to an electronic circuit. The resistive elements have substantially equal dimensions and resistive properties such that they have substantially equal resistance values and exhibit substantial equal current densities for any given applied voltage. Preferably, the substrate is a metal or other core material having a high thermal conductivity with a ceramic or other electrically insulating layer on each side of the core material. The resistive elements can be silk-screened onto the substrate and preferably have a substantially uniform thickness such that each of the resistive elements exhibit a uniform current density when subjected to an applied voltage.

With this configuration, thermal bending of the resistive component due to differential thermal expansion at one of the substrate's insulating layers is substantially offset by thermal bending due to differential thermal expansion at the other insulating layer. This permits design of a resistive component having a small physical size and a relatively low steady-state wattage rating, but with the ability to handle short duration, high-wattage power surges.

BRIEF DESCRIPTION OF THE DRAWINGS

A preferred exemplary embodiment of the present invention will hereinafter be described in conjunction with the appended drawings, wherein like designations denote like elements, and:

FIG. 1 is a top view of a preferred embodiment of a resistor constructed in accordance with the present invention;

FIG. 2 is a side view of the resistor of FIG. 1;

DESCRIPTION OF THE PREFERRED EMBODIMENT

Figure 3:
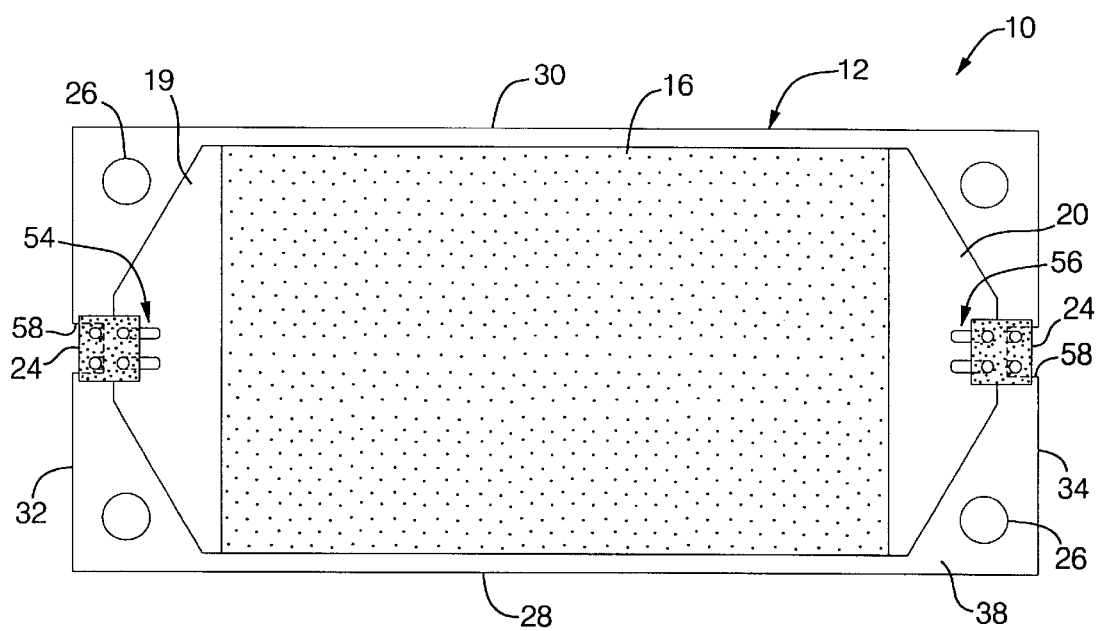
FIG. 3 is a bottom view of the resistor of FIG. 1.

Referring to the Figures and particularly to FIGS. 1 and 2, there is shown a preferred embodiment of a resistor 10 constructed in accordance with the present invention. In general, resistor 10 includes a substrate 12, first and second resistive layers 14, 16 located on opposite sides of substrate 12, and four conductive traces 17–20 that are each used to connect an opposing portion of one of the resistive layers 14, 16 to one of four pairs of terminals 22. The relative position of the terminals 22 at each end of resistor 10 is maintained using an insulating spacer 24. In use, resistor 10 is mounted via terminals 22 to a printed circuit board (not shown) using conventional soldering techniques. A mounting hole 26 is also provided at each corner of the substrate 12 to permit mechanical attachment of resistor 10 to a printed circuit board or other supporting structure using standoffs (not shown).

Figure 4:
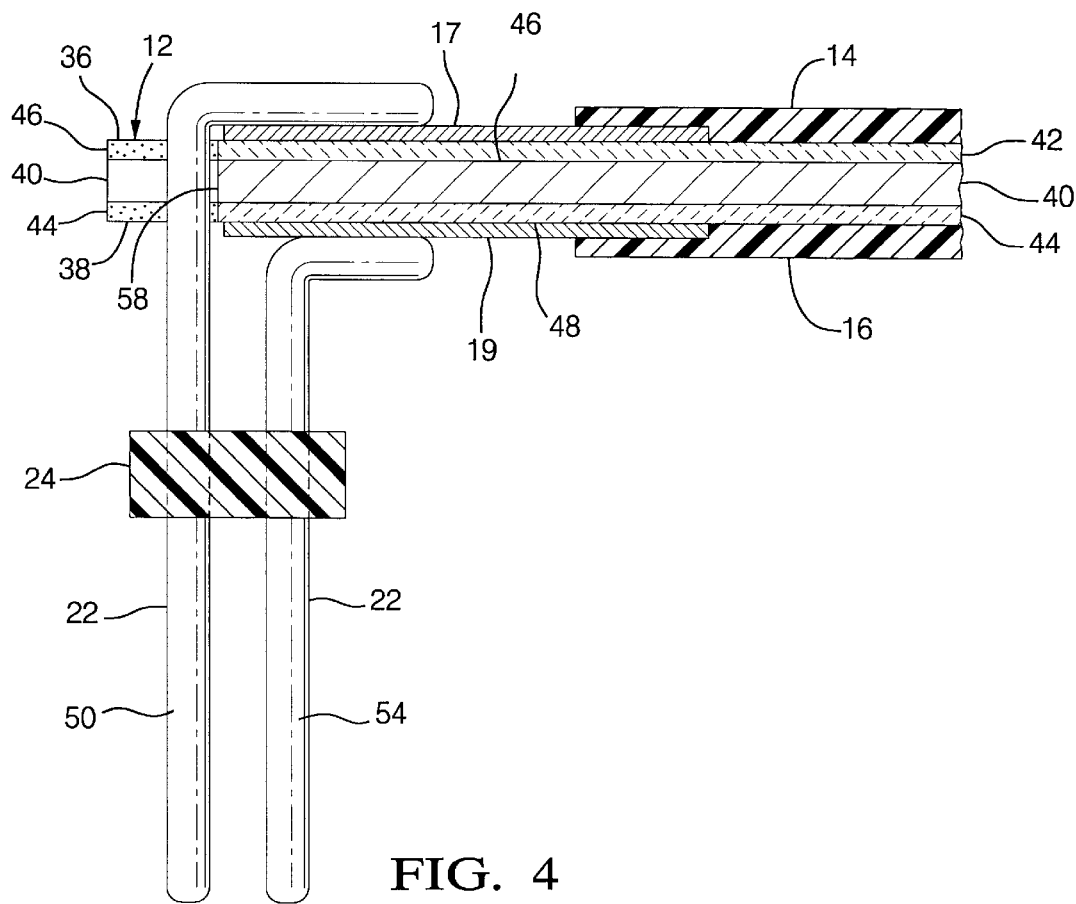
FIG. 4 is an enlarged, fragmentary, cross-sectional view through the 4—4 line of FIG. 1.
Figure 5:
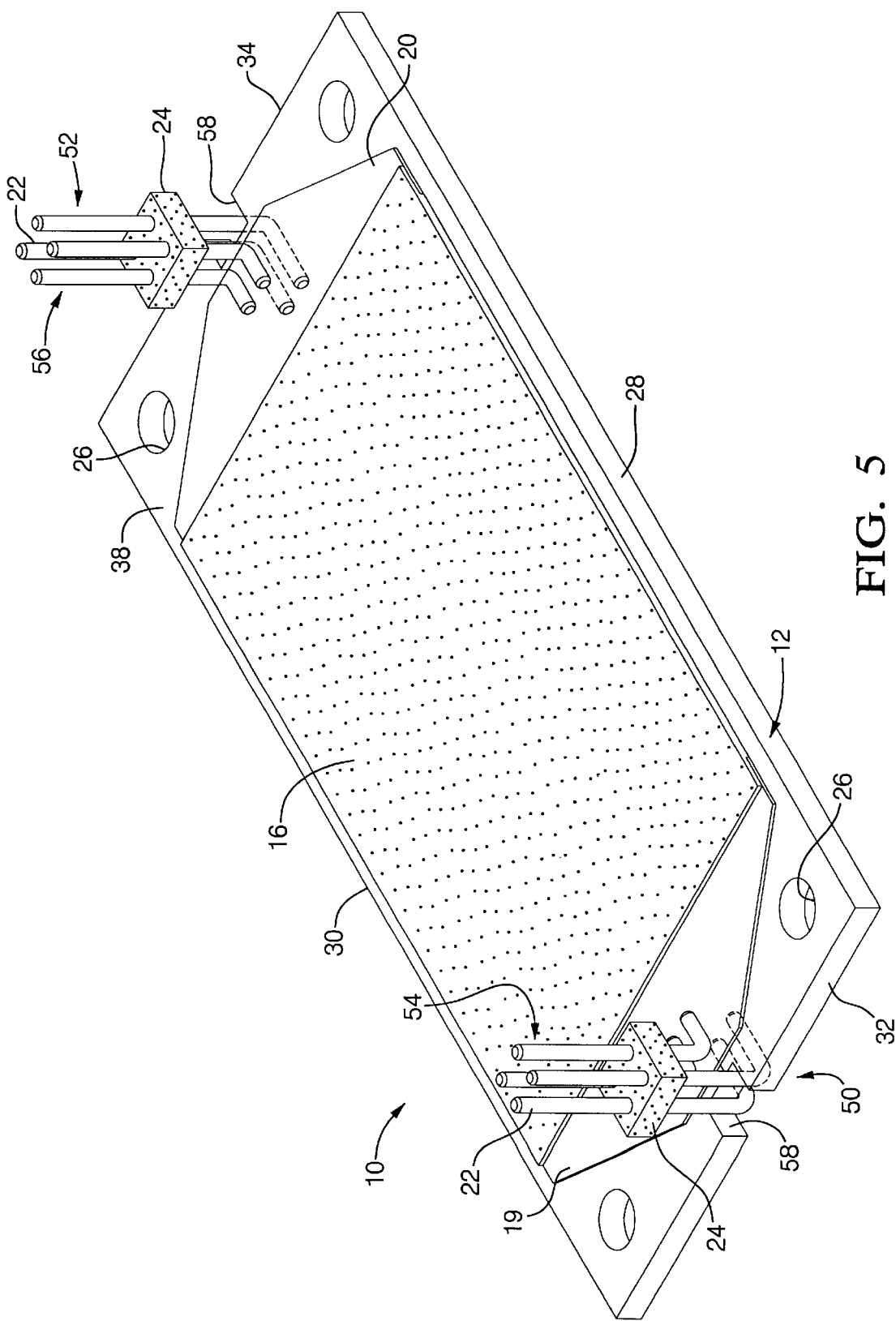
FIG. 5 is a bottom perspective view of the resistor of FIG. 1.

Substrate 12 is rectangular in shape and has a generally planar confirmation. It is defined by a pair of longitudinally extending edges 28, 30 that extend between two ends 32, 34. Substrate 12 includes an electrically insulating upper surface 36 on which resistive layer 14 and conductive traces 17, 18 are located. It also includes an electrically insulating lower surface 38 upon which resistive layer 16 and conductive traces 19, 20 are located. As best shown in FIG. 4, substrate 12 includes a steel or other metal core 40 having a high thermal conductivity along with upper and lower ceramic or other electrically nonconductive layers 42, 44 located on each side of metal core 40. Upper ceramic layer 42 is located on one side 46 of metal core 40 with lower ceramic layer 44 being located on the other side 48 of metal core 40. Thus, the upper surface of ceramic layer 42 comprises the upper, electrically insulating surface 36 of substrate 12 and the lower surface of ceramic layer 44 comprises the lower, electrically insulating surface 38 of substrate 12. Although not shown, ceramic layers 42, 44 can comprise unitary portions of a single ELPOR 2 coating that surrounds metal core 40. Such a substrate is available from FERRO-ECA Electronics Company of Erie, Pa.

Resistive layers 14, 16 extend from a first location proximate end 32 of substrate 12 to a second location proximate end 34. The first resistive layer 14 is located on upper surface 36 of substrate 12. Similarly, the second resistive layer 16 is located on the lower surface 38 of substrate 12. Each of the resistive layers has substantially equal dimensions and are formed from resistive materials having substantially equal properties. As a result, each of the resistive layers 14, 16 will have substantially equal resistance values and will exhibit substantially equal current densities for a given applied voltage. Accordingly, where the same voltages are applied to both resistive layers, they will dissipate equal amounts of power and will undergo the same degree of heating, thereby offsetting any bending or warping that would otherwise occur due to the differential thermal expansion of the different materials used. Preferably, the first and second resistive layers 14, 16 have identical dimensions and are formed from the same material so that they will have nearly identical resistance values. These resistive layers can be formed as a coating of Cermet ESL 3100 that is silk-screened onto each side of substrate 12. Preferably, the thickness of these resistive layers is uniform throughout so that they exhibit a substantially uniform current density for any given applied voltage.

Each of the conductive traces 17–20 is used to connect two of the terminals 22 to an end portion of one of the resistive layers 14, 16. In particular, conductive trace 17 electrically connects one end portion of resistive layer 14 to a first pair 50 of the terminals 22, conductive trace 18 electrically connects an opposing end of resistive layer 14 to a second pair 52 of the terminals 22, conductive trace 19 electrically connects a first end portion of the lower resistive layer 16 to a pair 54 of the terminals 22, and conductive trace 20 electrically connects the other end portion of resistive layer 16 to a pair 56 of the terminals 22. As shown, each of the conductive traces connects to the end portion of its corresponding resistive layer along the entire marginal edge of the resistive layer. As shown in FIG. 4, each conductive trace actually extends underneath the end portion of its corresponding resistive layer to ensure good electrical connection between the trace and resistive layer. This can be accomplished by printing the conductive trace on the substrate 12 prior to silk-screening of the resistive layers 14, 16. Also, it will be appreciated that the thickness of the conductive traces shown in the Figures is exaggerated as the conductive trace of the illustrated embodiment can have a thickness that is less than one-half of one percent of the thickness of the resistive layers 14, 16.

Terminals 22 each comprise a pin that extends to one side of substrate 12 in a direction normal to the plane of the substrate. Each terminal includes a 90° bend that permits the use of a lapped solder joint between the terminal and its corresponding conductive trace. For purposes of clarity, this lapped connection is shown without the solder joint. Terminal pairs 54 and 56 are located inwardly of the remaining terminals. They are electrically connected to the lower conductive traces 19, 20 and therefore need not traverse the plane of substrate 12. The remaining terminal pairs 50, 52 extend upwardly through a recessed portion 58 at each of the two ends 32, 34 of substrate 12. By utilizing a pair of terminals 22 for electrical connection to each of the conductive traces 17–20, a redundant electrical connection is provided which helps increase the reliability of the component. However, it will be appreciated that only one connection to each conductive trace is needed. Furthermore, it will be appreciated by those skilled in the art that, when resistive layers 14 and 16 are used together as a single resistor, the terminal pairs 50 and 54 at end 32 of the substrate can be electrically connected together, while the terminal pairs 52, 56 at the other end 34 of the substrate, can each be electrically connected together. This can be accomplished by, for example, soldering the terminals at one end into a single circuit pad on the printed circuit board and soldering the terminals at the other end into another single circuit pad on the printed circuit board. Alternatively, this could be accomplished during manufacturing of resistor 10 by electrically connecting the terminals or conductive traces together. Preferably, each terminal comprises a nickel-tin plated pin that is electrically and mechanically connected to its corresponding conductive trace using high temperature, silver-based solder.

In a highly preferred embodiment, substrate 12 is rectangular in shape and has dimensions of 65×30×1.57 mm. Resistive layers 14, 16 are rectangular and coextensive with each other and have dimensions of approximately 45×26× 0.009 mm. When made from Cermet ESL 3100, each resistive layer has a resistance of approximately 400 ohms.

Each of the conductive traces 17–20 comprise Cermet silver conductive ink, approximately 10–20 microns thick. For use as a current-limiting resistor, the terminals at each end 32, 34 of resistor 10 are electrically connected to each other so that the two resistive layers 14, 16 are connected in parallel, giving resistor 10 an overall resistance of approximately 200 ohms.

In this configuration, current flow through the resistor is evenly divided between the upper and lower resistive layers and is uniformly distributed across the width of the conductive layer. When subjected to high currents, some of the heat generated by resistive layer 14 is transferred to upper ceramic layer 42 and then to metal core 40. Similarly, much of the heat generated by resistive layer 16 is transferred to lower ceramic layer 44 and metal core 40. As will be appreciated, metal core 40, upper ceramic layer 42, and resistive layer 14 all have different coefficients of thermal expansion. Accordingly, these layers will experience differential thermal expansion which, through testing, has been found to warp the substrate and lead to catastrophic failure of the resistive layer. However, by providing the second resistive layer 16 on the lower ceramic layer 44 and by constructing the two resistive layers so that they have substantially equal dimensions and resistive properties, the differential thermal expansion at high currents that are due to one of the resistive layers is offset by that due to the other resistive layer. Consequently, resistor 10 is able to tolerate very large peak currents that have a duration on the order of seconds or fractions of a second. This provides a number of benefits. First, resistor 10 can be constructed of a sufficiently small size and weight that, when used as a current-limiting resistor in an electric vehicle high-voltage bus application, it can be circuit board mounted within the environmentally sealed enclosure used in those applications. This reduces costs since the component need not be manually installed. This obviates the need for hand-soldering of flying leads and application of heat-shrinkable tubing as has been utilized heretofore in these electric vehicle applications. Furthermore, quality and reliability can be improved since the component can be attached using well known, high-quality wave soldering techniques. Also, use of redundant terminals helps prevent single point failure of the component.

It will thus be apparent that there has been provided in accordance with the present invention a resistive component which achieves the aims and advantages specified herein. It will, of course, be understood that the foregoing description is of a preferred exemplary embodiment of the invention and that the invention is not limited to the specific embodiment shown. Various changes and modifications will become apparent to those skilled in the art and all such variations and modifications are intended to come within the scope of the appended claims.

We claim:

1. A resistor for use in an electronic circuit application involving short duration, high magnitude current flow through the resistor, comprising:

a substrate that includes:

a substantially planar metal core having opposing first and second sides;

a first, electrically insulating ceramic layer having a lower surface in contact with said first side of said metal core and having an upper surface that comprises an upper surface of said substrate; and a second electrically insulating ceramic layer having an upper surface in contact with said second side of said metal core and having a lower surface that comprises a lower surface of said substrate;

a first resistive coating on said upper surface of said first ceramic layer;

a second resistive coating on said lower surface of said second ceramic layer, said first and second resistive coatings having substantially equal dimensions and resistive properties, with said resistive coatings each extending from a first locations proximate a first edge of said substrate to a second location proximate a second edge of said substrate, whereby said resistive coatings have substantially equal resistance values and exhibit substantially uniform current densities throughout said resistive coatings for a given applied voltage;

a first electrically-conductive member disposed on said substrate and electrically connected to said first resistive coating at said first location;

a second electrically-conductive member disposed on said substrate and electrically connected to said first resistive coating at said second location;

a third electrically-conductive member disposed on said substrate and electrically connected to said second resistive coating at said first location;

a fourth electrically-conductive member disposed on said substrate and electrically connected to said second resistive coating at said second location;

wherein the electronic circuit provides power to an electric motor, and wherein the electronic circuit includes a capacitor bank coupled to a DC bus;

wherein said first resistive coating and said second resistive coating are connected electrically in parallel; and wherein said first and second resistive coatings are capable of periodic dissipation of electrical energy in the range of six hundred to eight hundred watts.

2. A resistor as defined in claim 1, wherein said first, second, third, and fourth electrically-conductive members comprise first, second, third, and fourth conductive traces, respectively.

3. A resistor as defined in claim 2, further comprising first, second, third, and fourth terminals connected to said first, second, third, and fourth conductive traces, respectively.

4. A resistor as defined in claim 1, wherein said first, second, third, and fourth electrically-conductive members comprise respective first, second, third, and fourth terminals for connecting said resistive coatings to a printed circuit board.

* * * * *